Figures 1, 2, 3:
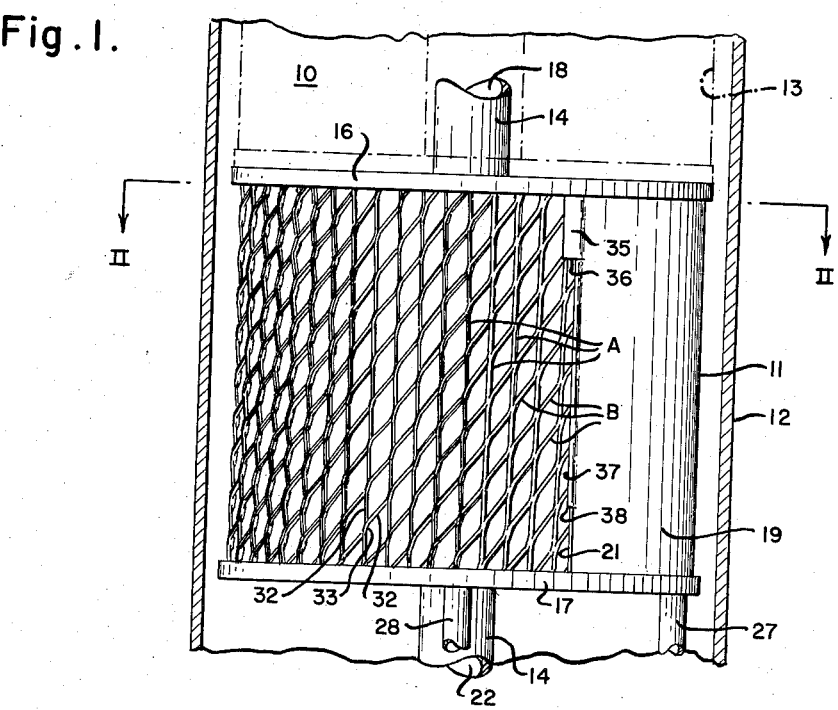

June 26, 1962 W. F. WALKER ET AL 3,040,500
VAPOR CONDENSER
Filed Sept. 11, 1958

INVENTORS
William Foster Walker &
George A. Sedar

United States Patent Office 3,040,500
Patented June 26, 1962

3,040,500
VAPOR CONDENSER
William Foster Walker, Bethel, and George A. Sedar, Pittsburgh, Pa., assignors to Hankison Corporation, Canonsburg, Pa., a corporation of Pennsylvania
Filed Sept. 11, 1958, Ser. No. 760,490
4 Claims. (Cl. 55—269)

This invention relates to a condenser for condensible vapors contained in air or other gas. More particularly, this invention pertains to new condensing mechanism to avoid entrainment or carry-over of residual moisture by gas which has been subjected to vapor condensation treatment.

There are innumerable situations in which a gas containing vapor is subjected to condensation for the removal of such vapor to an extent needed for the service for which the drier gas is being supplied, or in view of a need or desire to recover such vaporous material in condensed form. Perfect removal of vapor from gas by condensation is a theoretical concept as a practical matter. Relatively complete removal in a realistic sense of vapor from gas by condensation has commonly heretofore required unduly extensive and expensive investment and equipment.

In our invention, means are provided for the inhibiting in a relatively simple, inexpensive and highly effective way of vapor carry-over in gases undergoing condensation. Although the invention embodiment herein below described is shown in a form applicable to a condensing section in a filter and dehydrating apparatus of the kind illustrated in U.S. Patents Nos. 2,355,373 and 2,790,507, the new structural principle is applicable to a wide variety of gases including air, under pressure or otherwise, from which condensible liquid is to be removed as well as to a wide variety of other equipment which may be constructed in accordance with the teachings of our invention.

Other objects, features and advantages of our invention will be apparent from the following description and the accompanying drawings, showing one embodiment only as an example, in which FIGURE 1 is a view in elevation of one embodiment of a vapor condenser of this invention with the casing portion thereof in section for purposes of illustration;

FIGURE 2 is a view of the embodiment shown in FIGURE 1 taken along line II—II thereof, and FIGURE 3 is a view taken along line III—III of FIGURE 2.

Referring to the drawings, there is shown therein an apparatus 10 which for exemplary purposes may be made in general accordance with the fluid dehydrating and filtering construction illustrated in United States Patent No. 2,355,373 except that the cooling unit thereof has been replaced by a vapor condenser 11 of our invention disclosed herein enclosed within an over-all cylindrical casing 12 having closures at the top and bottom thereof and a filter unit 13 therein in superposed relation to condenser 11.

In the embodiment shown in FIGURES 1 to 3, inclusive, hereof, gas, which may be compressed air, containing vapor substances to be removed enters condenser 11 through the interior of a pipe 14 having a plug closure 15 therein adjacent the top of condenser section 11. An annular plate 16 serves as a top condenser head and an annular plate 17 serves as a bottom condenser head for the section 11. There is a tight joint between the exterior of pipe 14 and the opening in those condenser heads 16 and 17 through which pipe 14 passes. After leaving condenser 11, the dried gas moves upwardly past the edge of condenser head 16 into the filter portion 13 of apparatus 10 for filtering following which the dried and filtered gas passes through perforations in the upper portion 14' of pipe 14 above plug 15 to flow out of apparatus 10 through the interior 18 thereof. Such exiting dried and filtered gas will leave apparatus 10 at a temperature lower than the temperature of the incoming gas going to condenser 11 due to the cooling which occurs in the condenser. On the other hand, if the vapor condenser construction of this invention is substituted for the cooling portion of an apparatus such as that illustrated in United States Patent No. 2,790,507, the dried and filtered gas exiting from the apparatus will be at a predetermined higher temperature than the gas temperature leaving such condenser due to the heat exchange provision disclosed by that patent.

Vapor condenser 11 is provided with a condensing chamber formed principally by a helical wall 19 of rectangular strip shaped into the form of a spiral with a plurality of turns about the vertical axis of section 11 beginning at the inside with a vertical edge 20 and ending at the outside in a vertical edge 21, such turns being radially spaced apart as shown in FIGURES 2 and 3. The top and bottom edges of wall 19, which may be made of any suitable material such as metal or plastic preferably resistant to corrosion, are shown joined in sealed relation respectively to the under side and upper side of the condenser heads 16 and 17. Thus, the spiral condensing chamber and passage 26 in the embodiment shown is, for the most part, a relatively narrow and high passage for entering gas containing one or more vaporous substances to be condensed.

Such incoming gas passes from the interior 22 of pipe 14 into the entrance end 23 of the condensing chamber and passage 26 of condenser 11 through perforations 24 between the condenser heads 16 and 17. A continuous condensing coil 25 which is spiral in plan and undulatory in elevation is provided on one side of the spiral passage 26, said coil preferably being fastened to the wall on such one side of such spiral passage to leave a space 29 alongside. A coolant, such as water, at the desired lower or refrigerated temperature to provide selected cooling and vapor condensation may be circulated through coil 25 in whatever direction is desired. As shown, such coolant enters coil 25 through an inlet pipe 27 and after passing entirely therethrough is discharged through outlet pipe 28. As a consequence, gas passing through the spiral passage 26 from the inside to the outside thereof in the exemplary embodiment is constantly in contact with the relatively large cooling surface in that passage for effective cooling and vapor condensation.

The discharge end 30 of spiral passage 26 is the outlet portion of condenser section 11 and is lined on preferably both sides with a relatively rough mesh 31 having a central passage therebetween. Mesh 31 preferably is made in the form of expanded metal with "diamond" openings, the strand 32 borders of which are generally rectangular in section and joined at the diamond points by integral bond or web portions 33. In the making of such mesh, the strands 32 are tilted relative to the bounding surface planes of the mesh. In the preferred embodiment illustrated, the respective strands going in one direction are placed in generally vertical position "A" and the strands going in the other direction in the mesh are placed in generally downwardly sloped position "B" viewing it from the top to the bottom of condenser 11 and in the direction of flow as shown in FIGURE 1. Further, the tilt of the strands is such as to form projecting strand lines with the edges thereof farthest toward the middle of passage 30 in generally opposed relation to the direction of flow indicated by arrow 34.

The walls 19 to each side of outlet passage 30 thus contact the gas flowing therethrough which becomes somewhat turbulent there and remove residual moisture therefrom which runs down such strands toward condenser head 17 whence the condensate falls into a sump, for example, in the bottom of apparatus 10 available for discharge therefrom when appropriate. Preferably, too, the mesh 31 against the inner side, radially speaking, of passage portion 30 is continued around the outsidemost turn of wall 19 beyond edge 21 as shown in FIGURE 2 where it is designated as mesh portion 31'. Hence, not only is such gas contacted inside passage portion 30 but it is also contacted by the mesh portion 31' as the dried gas begins to climb toward filter unit 13 between mesh portion 31' and the inside of casing 12.

At the upper end of discharge edge 21 of wall 19, a baffle 35 is provided athwart the end of passage portion 30 and at least the gas flowing along the upper part of passage 26 is forced to dip below the bottom edge 36 of baffle 35 thereby promoting contact thereof, along with other outflowing gas from passage 26, with mesh 31. Further, a collector member in the form of a vertical lip 37 shown integral with the edge 21 is provided, said lip 37 forming an acute angle with the nearest surface of wall 19 of which it is a part or to which it may be attached. Preferably, the outer edge of lip 37 nearer to the center of passage portion 30 extends farther into passage 30 than the adjoining mesh 31. In the course of the flow of gas through the condensing chamber and passage 26, the lip 37 acts as an effective collector for particles of moisture tending to stay on the outside due to centrifugal force and such particles are conducted downwardly by lip 37 toward condenser head 17 and the aforesaid condensate sump. In the illustrated embodiment, collector member 37 extends between the bottom of baffle 35 and terminates at 38 above the bottom of edge 21. Hence, condensate on the floor of the spiral passage 26 may readily run out of condenser section 11 past edge 21 and over the edge of head 17 into the sump. If desired, condensate drain holes may also be provided through condenser head 17 at spaced points along the bottom of spiral passage 26.

The foregoing construction of our invention provides a relatively high capacity vapor condenser with full recovery of condensate and marked inhibition of carry-over or entrainment of residual moisture in the dried gas leaving condenser 11. Further, such relatively complete removal of vapor is provided at relatively low cost and without change in the size of the condenser.

Various modifications may be made in the construction of the illustrated embodiment and other embodiments may readily be devised without departing from the spirit of our invention or the scope of the appended claims.

We claim:
1. In a vapor condenser, apparatus comprising, in combination, a wall in generally flat spiral form about a vertical axis with the turns thereof radially spaced from each other to define a spiral condensing chamber and passage having an outer edge, temperature reducing means in said passage, condenser heads closing the top and bottom of said chamber, said passage being narrow in a horizontal direction and relatively high, means for admitting gas containing vapor to the inner portion of said spiral chamber, the outermost edge of said wall being substantially vertical and defining the outer end of said passage for the horizontal discharge of gas therefrom, a reticulated mesh of expanded metal attached to and lining the outer side of said passage outer end from said edge to a point inside said passage spaced therefrom, a reticulated mesh of expanded metal lining the opposite side of said passage end in opposed spaced relation to said first-mentioned mesh, said second-mentioned lining extending circumferentially outside beyond said edge, a peripheral casing in spaced coaxial relation to the outside of said wall, said reticulated mesh having strand edges thereof projecting into said passageway so as to incline against the direction of flow of said gas and sloping downwardly toward the bottom of said condenser when viewed in said direction of flow, a baffle athwart said passage at the top of said edge to cause gas to dip beneath said baffle upon leaving said passage end, and a substantially vertical collector lip along said edge between said baffle and a point above the bottom of said passage outer end, said collector lip forming an acute angle with the outer side of said passage end.

2. In a vapor condenser, apparatus comprising, in combination, an elongated horizontal chamber defining a spiral passage having an outer end and edge, a casing surrounding said chamber, vapor condensing means in said passage, means for admitting gas containing vapor to the inner end of said spiral passage, the outermost edge of said chamber being substantially vertical and defining the discharge end of said passage open in the direction of flow therein, a reticulated mesh lining on both sides of said passage at said end, said reticulated mesh having strand edges thereof projecting into said passage against the direction of flow of said gas and sloping downwardly toward the bottom of said condenser when viewed in said direction, a baffle across the top of said passage end, said reticulated mesh further extending beyond said passage end around a portion of the outside of said chamber facing said casing adjacent to said end, and a collector lip along said outer edge intermediate said baffle and the bottom of said passage, said collector lip projecting into said passage.

3. In a vapor condenser, apparatus comprising, in combination, a tortuous generally flat passage for gas containing vapor, vapor condensing means in said passage, the outermost edge on the outer side of said passage being substantially vertical and defining the discharge end thereof for the forward discharge of said gas, an expanded metal mesh material lining on both sides of said passage adjacent said end, said mesh having raised edges therein projecting into said passage, a baffle across the top of said passage end, and a collector member on the outer side of and projecting somewhat into said passage adjacent said edge intermediate said baffle and the bottom of said passage.

4. In a vapor condenser, apparatus comprising, in combination, an elongated horizontal chamber defining a spiral passage having an outer end and edge, vapor condensing means in said passage, means for admitting gas containing vapor to the inner end of said spiral passage, the outermost edge of said chamber being substantially vertical and defining the discharge end of said passage for the horizontal discharge of said gas, an expanded metal mesh lining on both sides of said passage adjacent said end, said mesh having edges thereof projecting into said passage against the direction of flow of said gas and sloping downwardly, said mesh further lining a portion of the outside of said chamber outwardly facing beyond but adjacent said end, and a collector member adjacent said edge intermediate the top and bottom of said passage, said collector member projecting somewhat into said passage.

References Cited in the file of this patent
UNITED STATES PATENTS

| | | |
|---|---|---|
| 704,199 | Lee | July 8, 1902 |
| 1,505,743 | Stebbins | Aug. 19, 1924 |
| 2,355,373 | Hankison | Aug. 8, 1944 |
| 2,479,625 | Kimmel | Aug. 23, 1949 |
| 2,513,010 | Deverall | June 27, 1950 |
| 2,645,560 | Otto | July 14, 1953 |

FOREIGN PATENTS

| | | |
|---|---|---|
| 574,844 | Germany | Mar. 30, 1930 |